(12) United States Patent
Kirchhoff et al.

(10) Patent No.: US 9,829,039 B2
(45) Date of Patent: Nov. 28, 2017

(54) ROLLER BEARING CAGE

(71) Applicant: Schaeffler Technologies AG & Co. KG, Herzogenaurach (DE)

(72) Inventors: Nico Kirchhoff, Schwebheim (DE); Claus Muller, Eckental (DE); Bertram Haag, Uhlfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 15 days.

(21) Appl. No.: 14/911,339

(22) PCT Filed: Jul. 1, 2014

(86) PCT No.: PCT/DE2014/200293
§ 371 (c)(1),
(2) Date: Feb. 10, 2016

(87) PCT Pub. No.: WO2015/024565
PCT Pub. Date: Feb. 26, 2015

(65) Prior Publication Data
US 2016/0201723 A1    Jul. 14, 2016

(30) Foreign Application Priority Data
Aug. 23, 2013  (DE) .......... 10 2013 216 745

(51) Int. Cl.
F16C 33/56   (2006.01)
F16C 33/46   (2006.01)

(52) U.S. Cl.
CPC ........ *F16C 33/4635* (2013.01); *F16C 33/565* (2013.01)

(58) Field of Classification Search
CPC .... F16C 33/3856; F16C 33/44; F16C 33/445; F16C 33/4635; F16C 33/56; F16C 33/565
See application file for complete search history.

(56) References Cited

U.S. PATENT DOCUMENTS

| 3,162,493 A * | 12/1964 | Heinz ................ F16C 33/3831 |
| | | 384/527 |
| 6,010,248 A | 1/2000 | Ueno et al. |
| 6,994,475 B2 | 2/2006 | Doll et al. |
| 7,910,217 B2 * | 3/2011 | Rai ...................... C23C 14/024 |
| | | 428/457 |
| 8,967,879 B2 | 3/2015 | Braun |
| 2003/0079640 A1 * | 5/2003 | Beatson ................ F16C 29/04 |
| | | 104/106 |
| 2003/0234181 A1 | 12/2003 | Palumbo et al. |
| 2009/0304321 A1 | 12/2009 | Horton et al. |

(Continued)

FOREIGN PATENT DOCUMENTS

| DE | 19851101 | 5/1999 |
| DE | 10262102 | 6/2006 |

(Continued)

OTHER PUBLICATIONS

Translation of EP0395130 obtained Apr. 19, 2017.*

*Primary Examiner* — James Pilkington
(74) *Attorney, Agent, or Firm* — Volpe and Koenig, P.C.

(57) ABSTRACT

A roller bearing cage, in particular for use with insufficient lubrication, including a plastic base body (2), a modified surface (4) of the base body (2), and a metallic coating (3) on the modified surface (4) of the base body (2).

20 Claims, 1 Drawing Sheet

(56) References Cited

U.S. PATENT DOCUMENTS

2011/0064349 A1    3/2011  Braun
2013/0322799 A1   12/2013  Schlegel et al.

FOREIGN PATENT DOCUMENTS

| | | |
|---|---|---|
| DE | 102008022311 | 11/2009 |
| DE | 102010013630 | 10/2011 |
| DE | 102010046803 | 3/2012 |
| DE | 102011079125 | 1/2013 |
| DE | 102012216650 | 3/2014 |
| EP | 0395130 | 10/1990 |
| WO | 2007014729 | 2/2007 |
| WO | 2009135477 | 11/2009 |

* cited by examiner

ROLLER BEARING CAGE

FIELD OF THE INVENTION

The invention relates to a roller bearing cage with a base body made from plastic on which a metallic coating is deposited.

BACKGROUND

A roller bearing cage made from metallized plastic is known, for example, from WO 2009/135477 A1. The metallic coating covers the base body at least in some sections and has a structure with a nanocrystalline grain. As the metals that form the coating, iron alloys or alloys based on titanium or nickel can be used. The metallic coating can be deposited electrochemically on the base body.

SUMMARY

The invention is based on the objective of refining a metallized plastic cage of a roller bearing relative to the cited prior art, especially with respect to durability and wear resistance.

This object is achieved by a roller bearing cage with one or more features of the invention. The roller bearing cage has a base body made from plastic whose surface is modified. A metallic coating is deposited on the modified surface of the base body. The roller bearing cage can be a bearing cage for a roller bearing, for example, cylinder roller bearing, conical roller bearing, or spherical roller bearing, or else a bearing cage of a ball bearing.

By modifying the surface of the base body, compared with the state of the surface of the base body after the manufacturing process, for example, injection molding process, improved adhesion of the metallic coating on the base body is achieved. This also applies in cases in which the plastic base body is produced through extrusion or chip removal. As the material for producing the base body, e.g., polyamide, in particular, glass fiber-reinforced polyamide PA66, or polyether ether ketone (PEEK) is suitable. An especially suitable PEEK variant is PEEK 10/10/10. Here, 10% each of carbon fiber, graphite, and polytetrafluoroethylene (PTFE) is added to the base material PEEK. Other plastics that are suitable for producing the base body are POM (polyoxymethylene), ABS (acrylonitrile butadiene styrene), PPA (polyphthalamide), PPS (polyphenylene sulfide), PEI (polyethylenimine), PP (polypropylene), PS (polystyrene), and PET (polyethylene terephtalate).

The plastic surface of the base body can be modified by a mechanical and/or chemical treatment. A mechanical modification is, e.g., the irradiation with particles, in particular, glass balls, for example, glass balls with a maximum diameter of 250 μm. A chemical surface modification can be achieved, for example, through acid cleaning or etching of the base body. The surface of the base body can also be modified through chemical docking of adhesive agents. The term "chemical modification" is also understood to include the use of colloidal systems, as well as sulfur-based systems. In particular, processing steps known as plato methods (plasma technology, surface treatment) are included under treatment methods with which a chemical modification of the surface of the base body is achieved. Numerous variants of plato methods have been published by Fraunhofer Gesellschaft zur Förderung der Angewandten Forschung e.V. See here, for example, laid-open German patent application DE 198 51 101 A1.

The modified plastic surface of the base body is suitable for the deposition of a metallic initial layer, for example, on a nickel or copper basis. The metallic coating of the roller bearing cage is advantageously formed as a nanocrystalline coating. The grain size of this coating is advantageously less than 500 nm, in particular, less than 100 nm. For the technological background, refer, for example, to German Patent DE 102 62 102 B4. The metallic coating of the roller bearing cage contains, for example, chromium, copper, nickel, cobalt, and/or iron and advantageously has a layer thickness in the range from 20-500 μm. Other suitable materials that can be contained in the metallic coating are silver and titanium. The hardness of the metallic coating is advantageously greater than 300 HV 0.3. In an alternative construction, the coating is formed as an NiP or NiP nano coating.

Surprisingly, it has been shown that despite the narrow geometrical tolerances that are generally required for roller bearing components, a relatively large waviness of the base body that can be produced, in particular, by modifying the surface, is not only tolerable, but even advantageous under various operating conditions, in particular, in the event of insufficient lubrication of the roller bearing. In one preferred construction, the modified surface of the base body has a waviness that is at least 10 times as large as the roughness of the modified surface and greater than the layer thickness of the metallic coating. Roughness is here understood to be the average roughness value Ra according to DIN EN ISO 4287. The waviness Wt is also to be understood in the sense of DIN EN ISO 4287, wherein, as limit wavelength values, the control values according to DIN EN ISO 1302, item 6.5.3 are to be used.

Advantageous refinements provide changes to the metallic coating in which either additional components are introduced into this coating or an additional layer is deposited on the metallic coating. Additional components in the metallic coating can be, e.g., wear-protection particles. Suitable hard-material particles that improve the wear resistance of the metallic coating are, e.g., SiC, TiC, $TiO_2$, and diamond. Instead of the hard material particles or in addition to such wear-protection particles, friction-reducing particles, e.g., made from PTFE, graphite, $MoS_2$, or $WS_2$, or combinations of these particles can also be contained in the metallic coating.

An additional layer deposited on the metallic coating can be formed, for example, as a sol-gel layer (e.g., $SiO_2$ or $ZrO_2$), also as a nanoparticle supported sol-gel layer. The wetting capacity and anti-fouling properties, in particular, can be optimized with such a layer.

An especially high hardness of the roller bearing cage can be produced by an additional layer on a carbon basis. This can be a pure carbon layer or a layer containing carbon and hydrogen. The layer can be doped in both cases by metals (e.g., W, Cr) or non-metals (e.g., Si, O).

As the top layer of the coating of the roller bearing cage, an injection molded layer can be deposited, for which thermal methods, plasma methods, and the HVOF method (high velocity oxygen fuel spraying method) are suitable. One special advantage of the HVOF method is the fact that the quantity of heat transferred into the material to be coated is relatively low compared with the quantity of material deposited, so that the plastic of the base body is not damaged.

The roller bearing cage according to the invention is suitable especially for use in roller bearings that are operated with insufficient lubrication. Roller bearings that are always or sometimes operated in dry conditions also achieve a high service life with the roller bearing cage according to the invention. The same applies for so-called media-lubricated roller bearings, that is, roller bearings that are located in a medium, in particular, that carry a flow of medium that is not provided primarily for lubrication purposes. Such a medium can be, for example, a liquefied gas or water, also seawater.

One special advantage of the roller bearing cage is in a very favorable relation between its mass and its mechanical load carrying capacity. The roller bearing cage is therefore also suitable for roller bearings that are operated at very high rotational speeds. The cross sections of the plastic base body here can be adapted just like the layer thicknesses of the metallic coating to the loads to be expected at various positions of the roller bearing cage. In the case of a metallic coating completely surrounding the base body, any effect of a surrounding medium and/or lubricant on the plastic of the base body is excluded. In particular, swelling of the base body is continuously prevented in this way. The dimensional stability achieved in this way for the roller bearing cage allows a construction with very low play, in particular, play of the roller bodies in the cage pockets, which in turn improves the suitability of the roller bearing cage for quickly rotating roller bearings. Likewise, the noise behavior of the roller bearing relative to conventional roller bearings with metal or plastic cages is also improved.

The many possible shapes of the metallic coating and optionally also the additional layer allow an adaptation of the properties of the roller bearing cage to different requirements. These relate, for example, to the physiological harmlessness and food tolerance, biocompatibility, anti-fouling properties, as well as ability to be magnetized. In all of the applications, the advantageously closed metallic coating on the roller bearing cage provides good heat dissipation that is especially important for the combination of insufficient lubrication and high rotational speeds and loads.

BRIEF DESCRIPTION OF THE DRAWINGS

Several embodiments of the invention are explained below in more detail with reference to a drawing. Shown herein are, each in schematic representation.

DETAILED DESCRIPTION OF THE PREFERRED EMBODIMENTS

Figure 1:
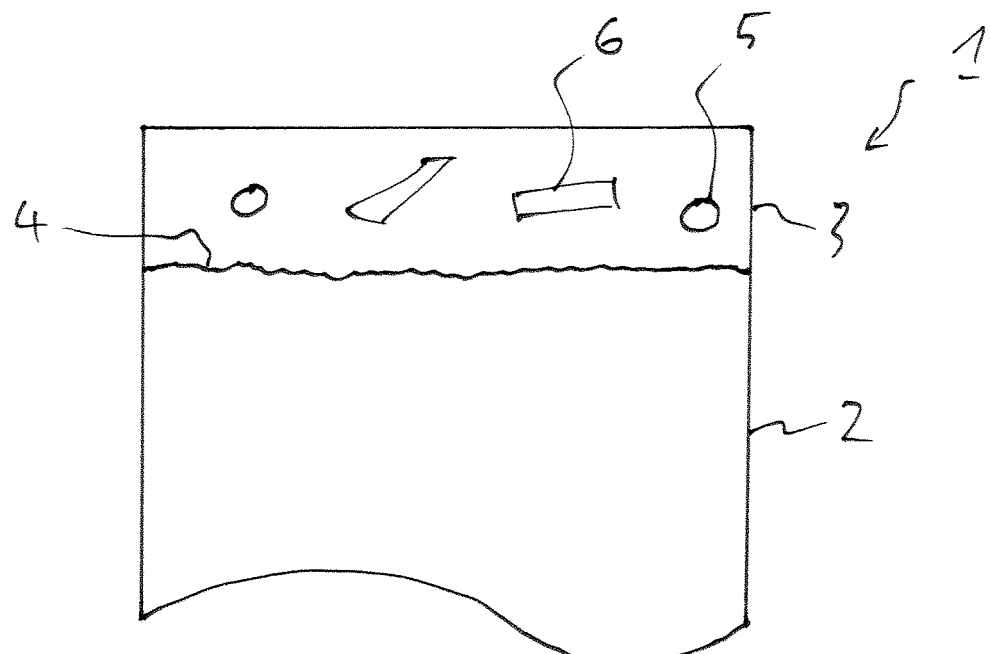
FIG. 1 in a section view, a first embodiment of a roller bearing cage made from metallized plastic, FIG. 2 in a view analogous to FIG. 1, a second embodiment of a roller bearing cage.
Figure 2:
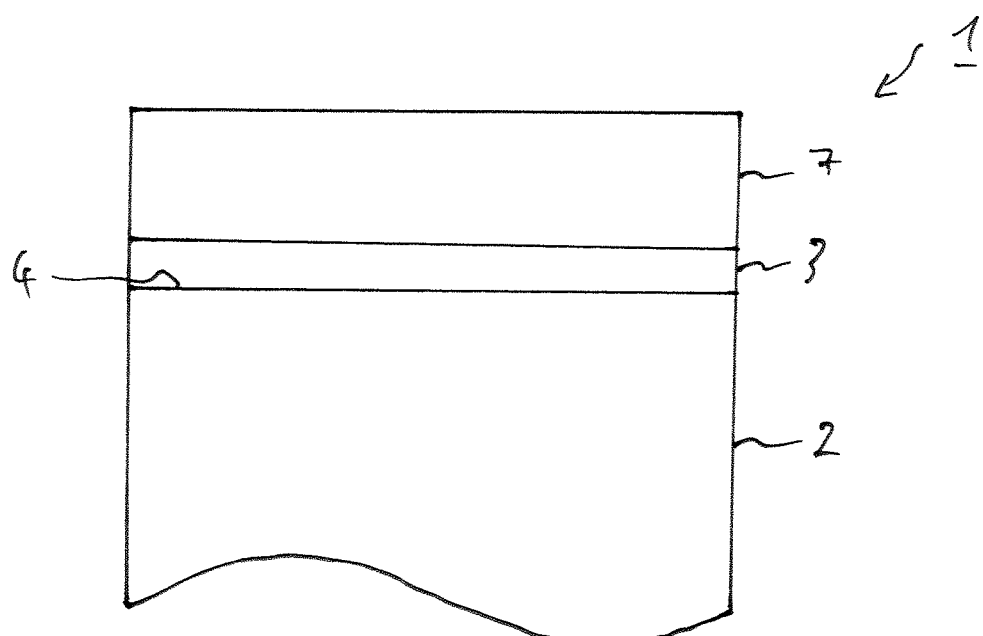

FIGS. 1 and 2 each show a greatly enlarged, not-to-scale cut-out of a cross section of a roller bearing cage that is designated overall with the reference symbol 1 and with respect to its principle function, reference is made to the prior art cited above.

Each roller bearing cage 1 has a base body 2 made from plastic on which a metallic coating 3 is located. The metallic coating 3 is here deposited on a modified surface 4 of the base body 2. The modification of the surface 4 of the base body 2 is shown in FIGS. 1 and 2 by a clearly recognizable roughness of the surface 4. Deviating from the symbolic representation according to FIGS. 1 and 2, the modification of the surface 4 of the base body 2 can also involve merely a chemical surface modification that has no influence on the measurable roughness. In each case, directly before the metallic coating 3 is deposited, properties of the surface 4 deviate from the surface condition of the base body 2 directly after its production.

In the embodiment according to FIG. 1, different particles 5, 6, namely wear-protection particles 5 and friction-reducing particles 6, are incorporated into the metallic coating 3. The particles 5, 6 have small dimensions such that they have no influence on the impermeability of the metallic coating 3. The metallic coating 3 is a nanocrystalline coating with an average grain size of less than 500 nm.

In the embodiment according to FIG. 2, the metallic coating 3 contains, in contrast to the embodiment according to FIG. 1, no additives. Instead, in this case, an additional layer 7 is deposited on the metallic coating 3. This can be, for example, a carbon layer or a sol-gel layer. In both cases, the sum of the layer thicknesses from the metallic coating 3 and additional layer 7 is no more than 0.5 mm.

Both in the embodiment according to FIG. 1 and also in the embodiment according to FIG. 2, final processing of the metallic coating 3 or the additional layer 7 can be provided by grinding, slide finishing, honing, or electropolishing.

LIST OF REFERENCE NUMBERS

1 Roller bearing cage
2 Base body
3 Metallic coating
4 Modified surface
5 Wear-protection particle
6 Friction-reducing particle
7 Additional layer

The invention claimed is:

1. A roller bearing cage comprising:
a base body made from plastic,
a modified surface on the base body, and
a metallic coating on the modified surface of the base body, wherein the modified surface of the base body has a waviness (Wt) that is at least ten times as large as a roughness (Ra) of the modified surface and greater than a layer thickness of the metallic coating.

2. The roller bearing cage according to claim 1, wherein the modified surface comprises a chemical modification of a surface of the base body.

3. The roller bearing cage according to claim 1, wherein the metallic coating contains wear-protection particles.

4. The roller bearing cage according to claim 1, wherein an additional layer is deposited on the metallic coating.

5. The roller bearing cage according to claim 4, wherein the additional layer comprises a sol-gel layer.

6. The roller bearing cage according to claim 4, wherein the additional layer comprises a carbon layer.

7. The roller bearing cage according to claim 1, wherein the metallic coating includes friction-reducing particles.

8. The roller bearing cage according to claim 1, wherein the metallic coating has a grain size that is less than 500 nm.

9. The roller bearing cage according to claim 1, wherein a thickness of the metallic layer is less than 0.5 mm.

10. The roller bearing cage according to claim 1, wherein the metallic layer includes chromium, copper, nickel, cobalt, and/or iron.

11. The roller bearing cage according to claim 1, wherein the metallic layer is formed as a nanocrystalline coating.

12. A method for producing a roller bearing cage comprising:
producing a base body made from plastic,
modifying a surface of the base body to form a modified surface,
depositing a metallic coating on the modified surface of the base body, wherein the modified surface of the base body has a waviness (Wt) that is at least ten times as large as a roughness (Ra) of the modified surface and greater than a layer thickness of the metallic coating.

13. The method according to claim 12, wherein the surface of the base body is modified by a plasma.

14. The method according to claim 12, further comprising mechanically pre-treating the surface of the base body.

15. The method according to claim 12, further comprising depositing an additional layer on the metallic coating by high velocity oxygen fuel spraying.

16. The method according to claim 12, wherein the metallic coating includes friction-reducing particles.

17. The method according to claim 12, wherein the metallic coating has a grain size that is less than 500 nm.

18. The method according to claim 12, wherein a thickness of the metallic layer is less than 0.5 mm.

19. The method according to claim 12, wherein the metallic layer includes chromium, copper, nickel, cobalt, and/or iron.

20. The method according to claim 12, wherein the metallic layer is formed as a nanocrystalline coating.

* * * * *